US012615468B1

(12) United States Patent
Rachal-Johnson

(10) Patent No.: US 12,615,468 B1
(45) Date of Patent: Apr. 28, 2026

(54) EARBUD CHARGING CASE WITH SPEAKERS

(71) Applicant: Natasha Rachal-Johnson, Deridder, CA (US)

(72) Inventor: Natasha Rachal-Johnson, Deridder, CA (US)

( * ) Notice: Subject to any disclaimer, the term of this patent is extended or adjusted under 35 U.S.C. 154(b) by 194 days.

(21) Appl. No.: 18/238,676

(22) Filed: Aug. 28, 2023

(51) Int. Cl.
*H04R 1/10* (2006.01)
*H04R 1/02* (2006.01)
*H04R 1/1025* (2026.01)

(52) U.S. Cl.
CPC ............. *H04R 1/1025* (2013.01); *H04R 1/02* (2013.01); *H04R 2201/10* (2013.01); *H04R 2460/17* (2013.01)

(58) Field of Classification Search
CPC .... H04R 1/1025; H04R 1/02; H04R 2201/10; H04R 2460/17
See application file for complete search history.

(56) References Cited

U.S. PATENT DOCUMENTS 11,115,746 B1 * 9/2021 Morrison ............. H04R 1/1025
11,172,101 B1 11/2021 Boozer
11,431,181 B2 8/2022 Chao
2017/0094399 A1 * 3/2017 Chandramohan ...... A45C 13/02
2020/0304899 A1 * 9/2020 Cramer ................. H02J 7/0045
2023/0217150 A1 * 7/2023 Seok .................... H04R 1/1016 381/74
2024/0430603 A1 * 12/2024 Johnston .................. H04R 1/02

* cited by examiner

*Primary Examiner* — Jason R Kurr
(74) *Attorney, Agent, or Firm* — Sanchelima & Associates, P.A.; Christian Sanchelima; Jesus Sanchelima

(57) ABSTRACT

An earbud charging case with speakers including a housing assembly, an electronic assembly, and a charging assembly. Housing assembly includes a case with a lid hingedly attached. The case includes earbuds receiving portions integrally formed inside the case to receive and secure a pair of earbuds. Electronic assembly includes a circuit board and the proper circuitry to integrate into the case a rechargeable battery, control means, charging contacts, speakers, and a USB type charging port. Control means allow the user to from various selectable options to charge the battery, the earbuds or to keep reproducing music through the speakers when the earbuds have low battery.

2 Claims, 2 Drawing Sheets

EARBUD CHARGING CASE WITH SPEAKERS

1. FIELD OF THE INVENTION

The present invention relates to an earbud charging case and, more particularly, to an earbud charging case with built-in speakers capable of reproducing music the earbuds have low battery.

2. DESCRIPTION OF THE RELATED ART

Several designs for earbud charging cases with speakers have been designed in the past. None of them, however, include a case with built-in speakers that can be activated using a selector or switch to turn both the speakers and the charging contacts.

Applicant believes that a related reference corresponds to U.S. Pat. No. 11,172,101 issued for multifunctional accessory case. Applicant believes that another related reference corresponds to U.S. Pat. No. 11,431,181 issued for wireless sound output device with charging function. None of these references, however, teach of a portable charging case with an internal battery that is used to charge a pair of wireless earbuds, where the case assembly has a pair of integrated speakers which will automatically continue the audio playback when the earbuds are inserted into the charging case.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device with built-in speakers to allow users to listen to music directly from the charging case when the earbuds have low battery.

It is another object of this invention to provide a device with speakers integrated into the charging case, users can enjoy music on the go without the need for separate audio devices.

It is still another object of the present invention to provide a device that allow the users to continue listening to music while charging the earbuds.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 3:
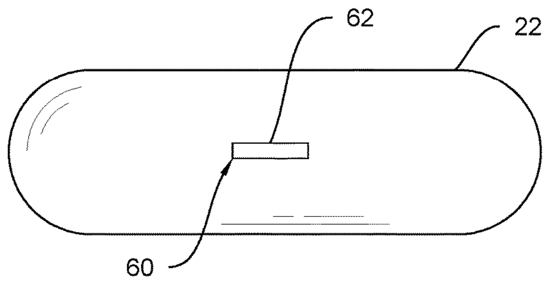

FIG. 3 illustrates bottom view of the housing assembly 20 having a charging port 62 to charge a battery 44 inside the case 22.

Figure 4:
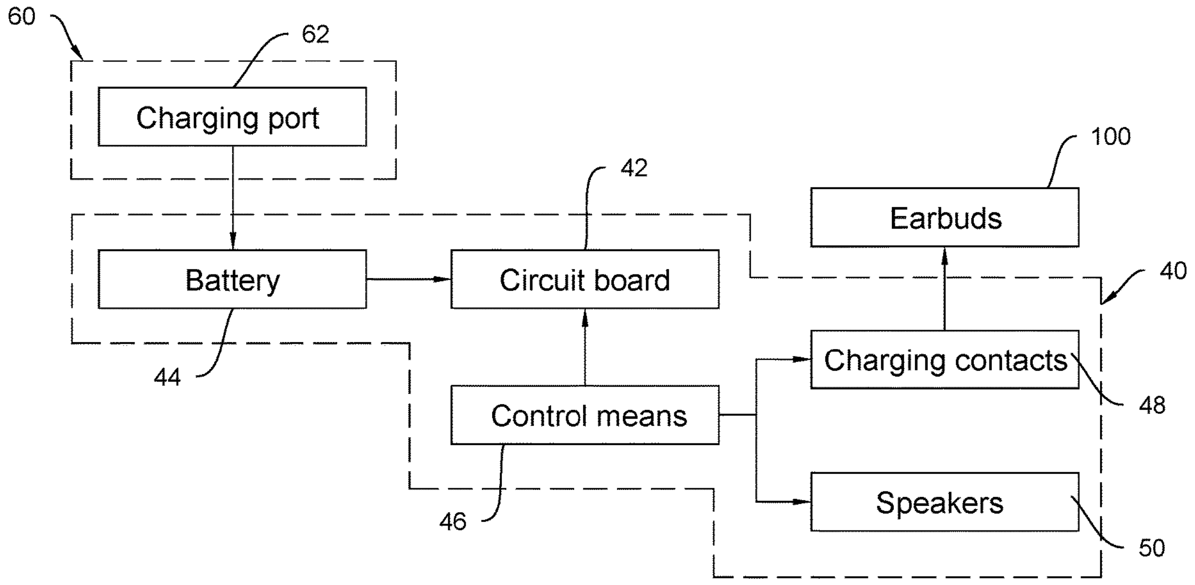

FIG. 4 is a representation of a diagram of the electronic assembly 40.

V. DETAILED DESCRIPTION OF THE EMBODIMENTS OF THE INVENTION

Referring now to the drawings, where the present invention is generally referred to with numeral 10, it can be observed that it basically includes a housing assembly 20, an electronic assembly 40, a charging assembly 60, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
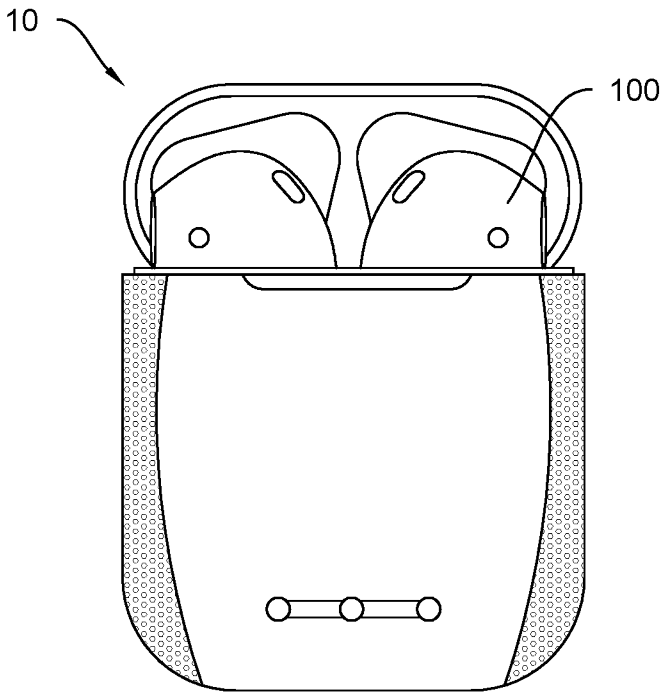
FIG. 1 represents a front view of an exemplary embodiment of the present invention 10.

Housing assembly 20 includes a case 22, a lid 24, and earbuds receiving portion 26. In an exemplary embodiment, case 22 provides a portable device configured to accommodate and safeguard earbuds 100 well known in the prior art when not in use. Best depicted in FIG. 1. The case 22 may be constructed and arranged to enclose and protect a portable electronic device. In a suitable embodiment, case 22 may be made of a rigid or semi-rigid material, such as plastic, metal, or a combination thereof. In a preferred embodiment, earbuds receiving portions 24 are formed in a manner that allows for easy insertion and removal of the earbuds 100.

In one embodiment, the lid 24 is pivotally connected to the case 22 through a hinge mechanism. The lid 24 may be configured to move between an open position, enabling access to the interior of the case, and a closed position, securely enclosing the earbuds 100. It should be considered that the lid 24 may include integrally formed therein another earbud receiving portion to conform to the shape of a top portion of the earbuds 100 when the lid 24 is in a close position.

Figure 2:
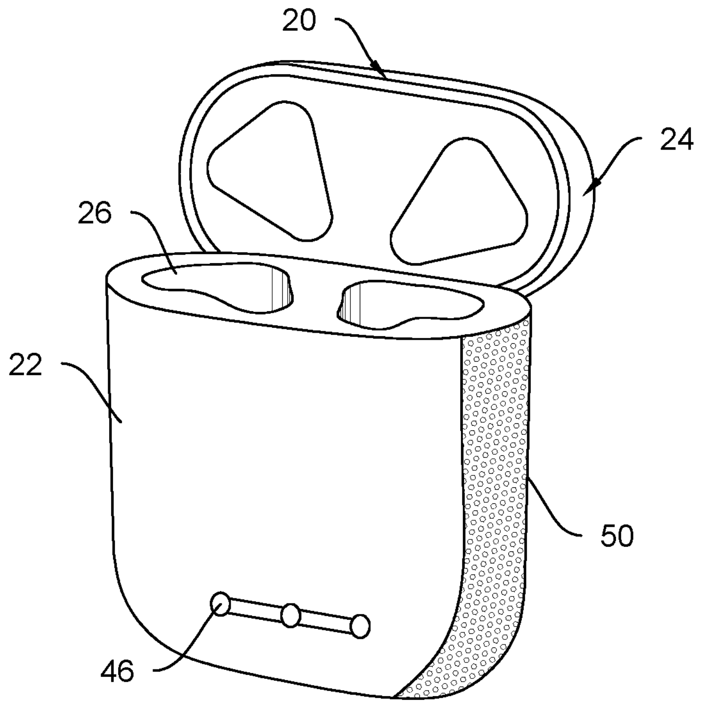
FIG. 2 shows an isometric view of the housing assembly 40 including speakers 50 at the sides thereof.

In one embodiment, earbuds receiving portions 24 are integrally formed inside the case 22. As best illustrated in FIG. 2. The earbuds receiving portions 26 may be specifically shaped and dimensioned to securely hold and protect the earbuds 100. In a preferred embodiment, earbuds receiving portions 100 may be cavities, recess, or compartments that snugly accommodate the earbuds 100. It should be considered that the shape of the receiving portions 26 may correspond to the shape of the earbuds 100, thus ensuring a secure fit.

In various embodiments, case 22 may incorporate additional features such as cushioning, or shock-absorbing materials within the earbuds receiving portions 26 to provide further protections to the earbuds. Additionally, the case may include retention mechanisms, such as elastic bands or clips, to secure the earbuds 100 in place within the earbuds receiving portions 26.

Electronic assembly 40 includes a circuit board 42, a battery 44, control means 46, charging contacts 48, and speakers 50. In an exemplary embodiment, the case 22 incorporates the circuit board 42 therein. It should be considered that the circuit board 42 may include the proper circuitry, memory, processor or the like to facilitate the integration of various components, such as the battery 44, control means 46, charging contacts 48, and speakers 50. As best illustrated in FIG. 4. The battery 44 may be a rechargeable battery incorporated inside the case 22, wherein the battery 44 is electrically connected to the circuit board 42, providing power to the speakers 50 and enabling the charging to the earbuds 100 through the charging contacts 48.

In a suitable embodiment, control means 46 may be buttons or a three-way switch may be incorporated in the case 22, wherein control means 46 are electrically connected to the circuit board 42. In a preferred embodiment, control means may include a plurality of selectable features, such as the speaker 50, a charging mode selection for the battery 44, and charging mode selection for the earbuds 100. In one embodiment, control means 46 allows the user to toggle different audio options, selecting either the speakers 50 or the earbuds 100. Additionally, control means 46 enables the user to select the charging mode for the battery 44, providing flexibility and control over the charging process.

In an exemplary embodiment, speakers 50 are mounted at the laterals of the case 22, offering an enhanced audio experience. As FIG. 2 illustrates. It may be considered for the speakers 50 to provide audio output directly from the case, allowing the user to continue listening to music when the earbuds 100 have low battery.

Charging assembly 60 including a charging port 62. Referring to FIG. 3, the case 22 features the charging port 62 at the bottom side thereof. Nonetheless, it should be considered that charging port 62 may be incorporated in any other side of case 22. In a preferred embodiment, charging port 62 may be an USB type port in its various embodiments, allowing compatibility with a wide range of charging cables and accessories. Charging port 62 serves the dual purpose of charging the rechargeable battery 44 within the case 22 and facilitating the charging of the earbuds 100.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An earbud charging case with speakers, comprising:

a) a housing assembly including a case, a lid, and earbuds receiving portions, wherein the case is configured to enclose and protect an electronic device, one or more of said earbuds receiving portions are integrally formed within said case, said lid is configured to be mounted on top of said case to enclose and protect a top portion of said electronic device, said earbuds receiving portions are shaped and dimensioned to secure and protect said electronic device, wherein said electronic device is a pair of earbuds, wherein said case has a substantially rectangular profile with rounded corners when viewed from above;

b) an electronic assembly having a circuit board, a battery, control means, charging contacts, and speakers, wherein said circuit board includes the proper circuitry to integrate said battery, said control means, said charging contacts, and said speakers, wherein said circuit board, said battery, said control means, said charging contacts, and said speakers are integrated inside said casing, said battery is a rechargeable battery, said control means are a control mechanism with various selectable options, including audio output and charging modes, wherein said speakers are positioned at opposite lateral sides of said case and extend along a substantial portion of the height of said case; and c) a charging assembly including a charging port, wherein said charging port is electrically connected to said battery, said charging port is integrated into said case, said speakers are incorporated at the laterals of said case, wherein said charging port comprises a Universal Serial Bus Type-C connector recessed within a bottom wall of said case.

2. An earbud charging case with speakers, consisting of:

a) a housing assembly including a case, a lid, and earbuds receiving portions, wherein the case is configured to enclose and protect an electronic device, one or more of said earbuds receiving portions are integrally formed within said case, said lid is configured to be mounted on top of said case to enclose and protect a top portion of said electronic device, said earbuds receiving portions are shaped and dimensioned to secure and protect said electronic device, wherein said electronic device is a pair of earbuds, said lid is pivotally connected to said case through a hinge mechanism, wherein said earbuds receiving portions comprise cylindrical cavities with curved bottom surfaces conforming to earbud shapes;

b) an electronic assembly having a circuit board, a battery, control means, charging contacts, and speakers, wherein said circuit board includes the proper circuitry to integrate said battery, said control means, said charging contacts, and said speakers, wherein said circuit board, said battery, said control means, said charging contacts, and said speakers are integrated inside said casing, said battery is a rechargeable battery, said control means are a control mechanism with various selectable options, including audio output and charging modes, said charging contacts are pins inside said earbuds receiving portions respectively, wherein said pins are adapted to be in contact with said pair of earbuds, wherein said speakers comprise acoustic drivers positioned behind mesh grilles at lateral surfaces of said case; and c) a charging assembly including a charging port, wherein said charging port is electrically connected to said battery, said charging port is integrated into said case, said speakers are incorporated at the laterals of said case, said charging port is a USB type port at the bottom of said case, wherein said charging port is surrounded by a protective collar extending outward from said bottom surface.

* * * * *